United States Patent

[11] 3,609,713

[72] Inventors Robert M. Wooton;
Duncan E. Cull; Robert L. Robke, all of Dayton, Ohio
[21] Appl. No. 791,118
[22] Filed Jan. 14, 1969
[45] Patented Sept. 28, 1971
[73] Assignee The National Cash Register Company
Dayton, Ohio

[54] DATA ENTRY MEANS
11 Claims, 7 Drawing Figs.

[52] U.S. Cl. .......... 340/173 LM, 340/173 LS, 340/173 SP
[51] Int. Cl. .......... G11c 17/00, G11c 13/04
[50] Field of Search .......... 340/365, 173 LT, 173 LS, 173 LM

[56] References Cited
UNITED STATES PATENTS

| | | | |
|---|---|---|---|
| 3,479,652 | 11/1969 | Foster | 340/173 R |
| 2,861,262 | 11/1958 | Pankove | 340/365 |

*Primary Examiner*—Stanley M. Urynowicz, Jr.
*Attorneys*—Louis A. Kline and Albert L. Sessler, Jr.

ABSTRACT: An electrooptical data entry device for translating data, which may be manually entered, as from a keyboard, into electrical signals. A plurality of radiation-emitting elements are located in a plurality of channels in the device, and a radiation-sensitive element extends transversely across the channels. Shutter members controlled by keys of the keyboard may be selectively moved into the channels to block radiation in said channels, thus producing a change in electrical output of the radiation-sensitive element. Electrical circuitry is provided for sequentially energizing the various radiation-emitting elements to provide sequential sensing of the channels to determine which are blocked by the shutter members. Gating circuitry is provided for generating output signals representative of the information entered from the keyboard.

INVENTORS
ROBERT M. WOOTON
DUNCAN E. CULL
ROBERT L. ROBKE
BY Louis A. Kline
Albert L. Sessler, Jr.
THEIR ATTORNEYS

INVENTORS
ROBERT M. WOOTON
DUNCAN E. CULL
ROBERT L. ROBKE

BY Louis A Kline
Albert L Sessler
THEIR ATTORNEYS

INVENTORS
ROBERT M. WOOTON
DUNCAN E. CULL
ROBERT L. ROBKE
BY Louis A. Kline
Albert L. Sessler
THEIR ATTORNEYS INVENTORS
ROBERT M. WOOTON
DUNCAN E. CULL
ROBERT L. ROBKE
BY Louis A Kline
Albert L. Sessler
THEIR ATTORNEYS INVENTORS
ROBERT M. WOOTON
DUNCAN E. CULL
ROBERT L. ROBKE
BY Louis A. Kline
Albert L. Sessler, Jr.
THEIR ATTORNEYS

INVENTORS
ROBERT M. WOOTON
DUNCAN E. CULL
ROBERT L. ROBKE

BY Louis A Kline
Albert L. Sessler, Jr.
THEIR ATTORNEYS

DATA ENTRY MEANS

The invention here described was made in the course of or under a contract or subcontract thereunder, with the Navy Department.

BACKGROUND OF THE INVENTION

This invention relates to data entry means for translating data, which may be entered from a keyboard or by other appropriate means, into electrical signals which may be used to control the entry of information into a shift register or other suitable utilizing device, such as an electronic data processing system.

A number of systems have been developed for the translation of manually entered alphanumeric data into electrical signals representative of said data. One such system is shown in U.S. Pat. No. 3,092,310, issued June 4, 1963, inventors Werner Flieg et al., in which a mechanical keyboard and encoding construction similar to that of the present invention is disclosed.

SUMMARY OF THE INVENTION

The present invention provides a data entry device which has the desirable characteristics of low weight, compactness, reliability, and low cost. These are achieved by the use of electro-optical means for converting information into electrical signals, and by the use of novel electrical circuitry to convert these signals into a form which may be readily applied to a shift register or some other suitable device.

In the present device, a plurality of radiation-emitting elements are located in a plurality of channels, and a radiation-sensitive element extends transversely across the channels at a location spaced apart from the radiation-emitting elements. A plurality of shutter members, controlled by the keys of the keyboard device, are constructed and arranged so that they may be selectively moved into the channels at locations between the radiation-emitting elements and the radiation-sensitive element so as to prevent radiation, in selected channels, from impinging upon the radiation-sensitive element.

Electrical circuitry is provided for sequentially energizing the various radiation-emitting elements, and for utilizing the output of the radiation-sensitive means in such a manner as to provide encoded output signals corresponding to keyboard-entered information at gates associated with the various channels, said output signals appearing sequentially at the outputs of said gates, for application to a shift register or other suitable utilizing device.

A major advantage of the encoding system of the present invention lies in the fact that, due to its sequential operation, only one radiation sensor and one sensor amplifier are required, instead of the usual plurality of sensors and individual sensor amplifiers which are required in other encoding systems. Another advantage resides in the high reliability achieved by the use of all solid state components.

Electronic interlock means are provided to insure that the data entered into the data input device by each key depression is sampled once, and to prevent further sampling of data until the transfer of data out of the shift register or other utilizing device has been completed. The interlock means further insures that a key which has been depressed must be fully released, and that key or another key then fully depressed, before a second sampling of data can take place.

It is accordingly an object of the present invention to provide electro-optical data entry means for converting data which has been entered into said entry means to electrical signals which may be applied to a utilizing device.

A further object is to provide such data entry means which is lightweight, compact, reliable, and low in cost.

An additional object is to provide data entry means which produces encoded output signals by means of sequential electro-optical sensing of key-controlled mechanical elements.

BRIEF DESCRIPTION OF THE DRAWINGS

With these and other objects, which will become apparent from the following description, in view, the invention includes certain novel features and combinations of parts, one form or embodiment of which is hereinafter described with reference to the drawings which accompany and form a part of this specification.

In the drawings

DESCRIPTION OF THE PREFERRED EMBODIMENT

Figure 1:
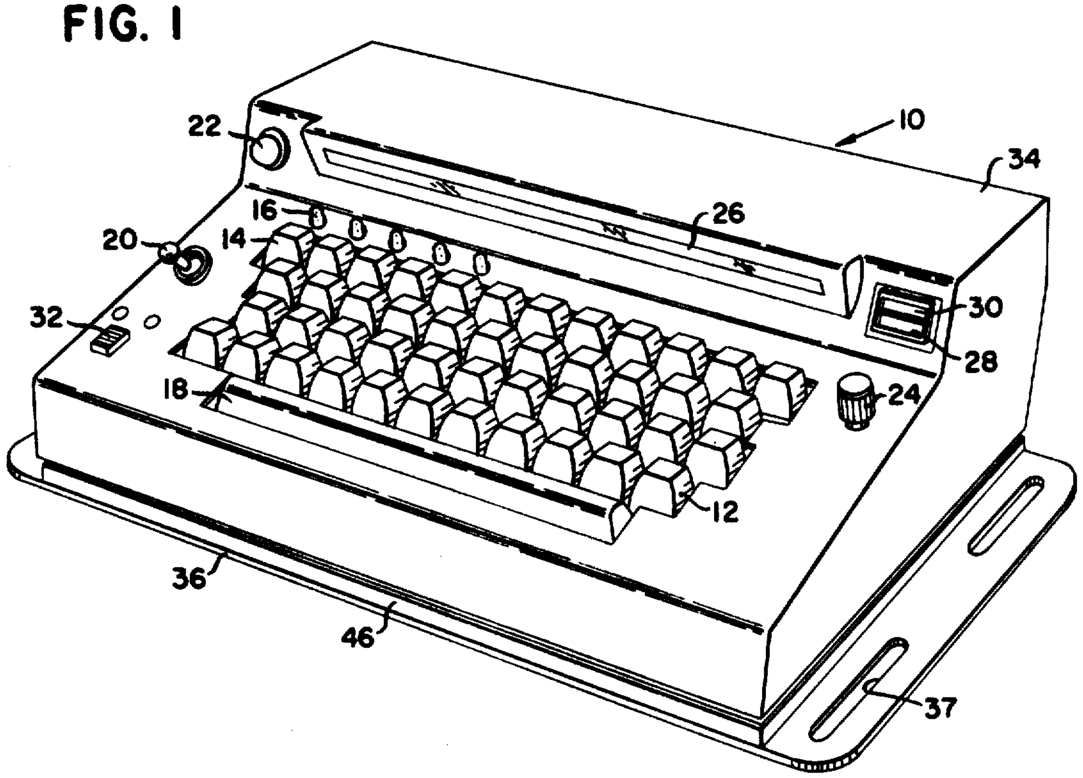
FIG. 1, on the sheet with FIG. 3, is a perspective view of an alphanumeric keyboard device in accordance with the invention.

Referring now to FIG. 1, the data entry unit 10 comprises a plurality of data keys 12, a plurality of control keys 14, a plurality of control key indicators 16, a space bar 18, an "on-off" switch 20, a power indicator 22, an intensity control 24, a keyboard-illuminating element 26, an "end-of-line" indicator 28, an "upper case" indicator 30, a lock 32 to lock all keys in an "up" position, and a housing 34 supported on a base 36 having a plurality of mounting slots 37. Around its periphery, the base is provided with a slotted edge member 46, in which the bottom edge of the housing 34 is received.

Figure 3:
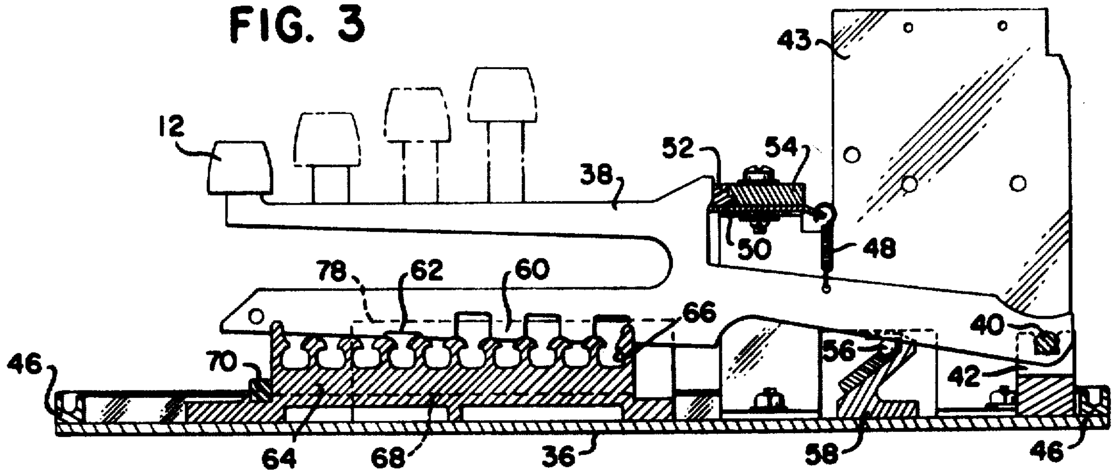
FIG. 3, on the sheet with FIG. 1, is a sectional view taken along line 3—3 of FIG. 2.
Figure 2:
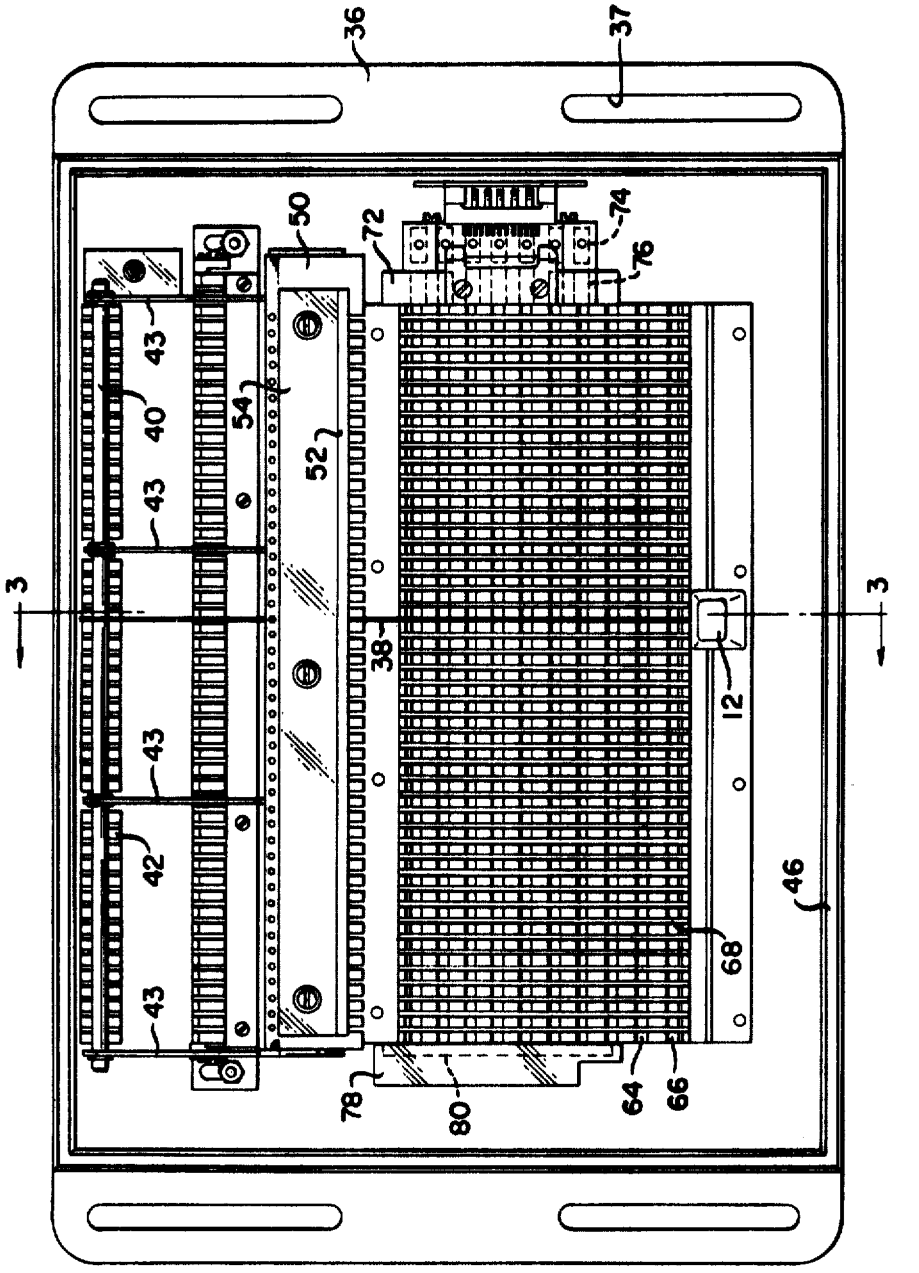
FIG. 2 is a top plan view of a channeled member of the keyboard device, showing the radiation-sensitive and radiation-emitting elements, the radiation channels extending therebetween, and a representative key-controlled channel blocking means.

A typical data key 12 is also shown in FIGS. 2 and 3, connected to a key lever 38, which is pivoted on a shaft 40 supported by mountings 42 and support plates 43 fixed to the base 36. The support plates 43 also provide means for mounting the power supply and other electrical components required in the data entry device 10.

Each key lever 38, with associated key 12, is normally held in its "up" or nondepressed position by a spring 48 connected at one end to the key lever, and at the other end to a support 50 secured to certain of the support plates 43. A stop 52, made of nylon or other suitable shock-resistant material, is fixed to a bar 54 fastened to the support 50, and limits the clockwise movement of the key levers 38, as viewed in FIG. 3. A conventional interlock means, comprising a plurality of spherical elements 56, such as ball bearings, retained in a holder 58, prevents the depression of more than one key at a time.

The lower portion of each key lever 38 is provided with a number of cutouts defining data shutter portions such as portions 60 in FIG. 3, which are adapted to perform a radiation-blocking function, as will subsequently be described. The location of the shutter portions on a given key lever corresponds to the designation or value of that key, in accordance with a predetermined code. All key levers 38 are also provided with a "strobe" portion 62, having a lower surface which is slightly elevated with respect to the lower surface of the data shutter portions, for a purpose which will be subsequently described. The key levers for the control keys 14 are of generally similar configuration to the key levers 38 for the data keys 12.

Fixed to the base 36, and extending transversely of the key levers 38, is a channel member 64, which is formed to include a plurality of radiation channels 66. Extending perpendicular to the channels 66 are a plurality of slots 68 positioned and dimensioned to receive the key levers 38 when depressed. A stop 70 is disposed at the left side of the channel member 64, as viewed in FIG. 3, in order to limit downward movement of the key levers 38.

Positioned at the upper and of the channel member 64, as viewed in FIG. 2, is a diode assembly 72, in which are included a plurality of diodes 74, and a plurality of lenses 76 for directing radiation from the diodes 74 into the respective channels 66. It will be noted that diodes 74 are not provided for all of the channels 66, since the total capacity of the channel member 64 is not required for the particular code employed. It will be obvious that additional diodes could be provided for the unused channels if additional encoding capacity is required.

At the other end of the channel member 64, as shown in FIG. 2, a solar cell assembly 78 is positioned, in which is disposed a solar cell 80, which extends across all of the channels with which diodes 74 are associated. While several types of diodes and solar cells having matching characteristics may be employed in the illustrated embodiment, the diodes are gallium arsenide mesa light emitting diodes manufactured by Monsanto Chemical Company, which radiate infrared energy at 9,000 A. when energized, and the infrared light sensor is a single P on N silicon solar cell manufactured by Westinghouse Electric Corporation. It will be obvious that other types of radiation-emitting elements and radiation-sensitive elements could be used in place of the diodes and solar cell of the present embodiment, if desired.

It will readily be seen that when power is applied to the data entry device in such a manner as to energize the diodes 74, radiation is generated and passes through the various channels 66 of the channel member 64 to impinge on the solar cell 80 and thereby produce a change in the potential generated by said solar cell, which potential may be detected by suitable means. When a key is depressed, radiation through certain channels is blocked by interpostion of the shutter portion 60 of the key lever 38 associated with the selected key. Also, the strobe portion 62 of the selected key lever is interposed in the strobe channel and thus blocks radiation in that channel. A strobe portion 62 is provided on each key lever. Since the lower surface of the strobe portion 62 is cut away to be slightly higher than the lower surface of the shutter portion 60, the strobe channel is not blocked until a time slightly later than the blocking of the associated data channels. As will subsequently be described in detail, the strobe signal performs a timing function in the development of the desired data output signals, and it is therefore desirable that the strobe signal be generated at a time slightly later than the data signal.

Figure 6A:
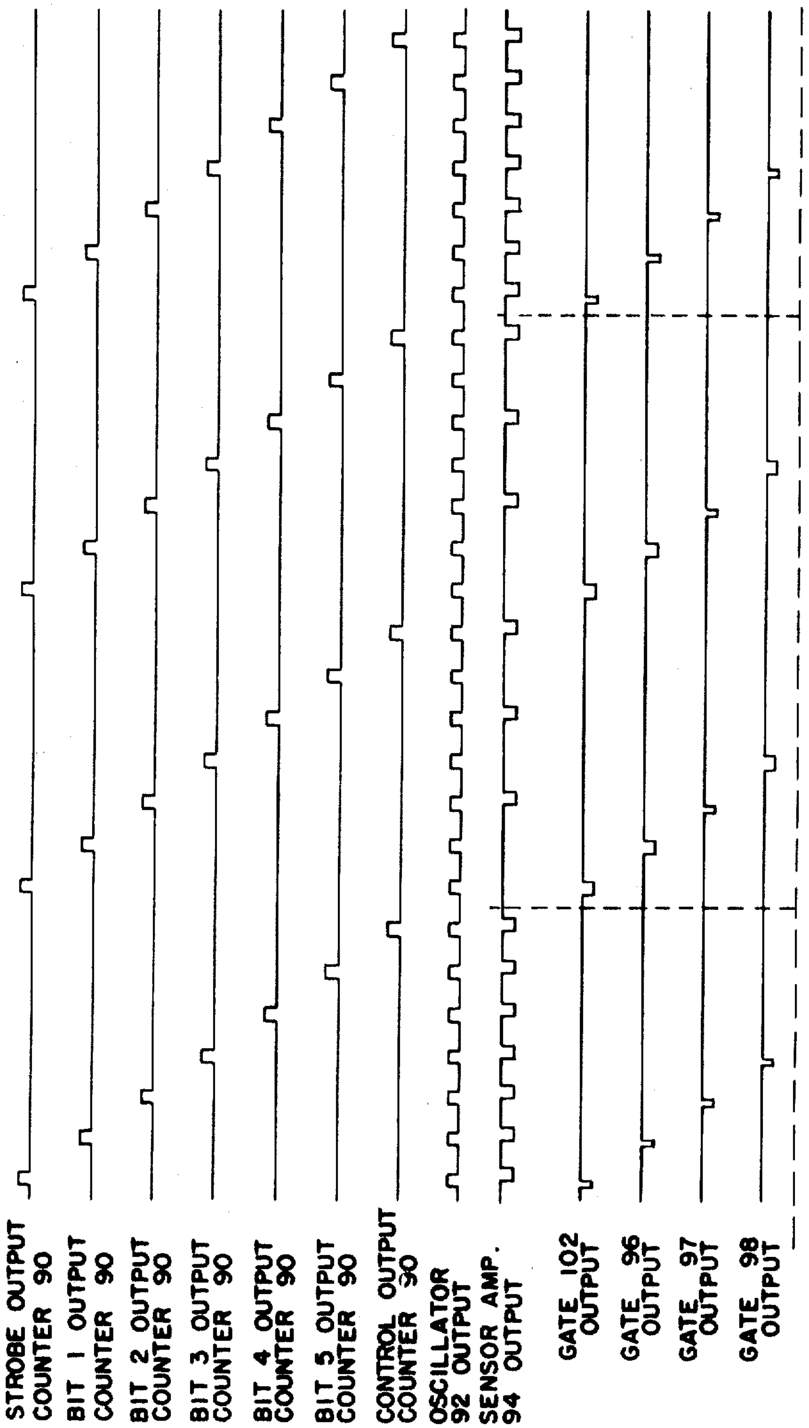
FIGS. 6A and 6B show a plurality of waveforms associated with various elements of the system shown in the diagrams of FIGS. 4 and 5.
Figure 6B:
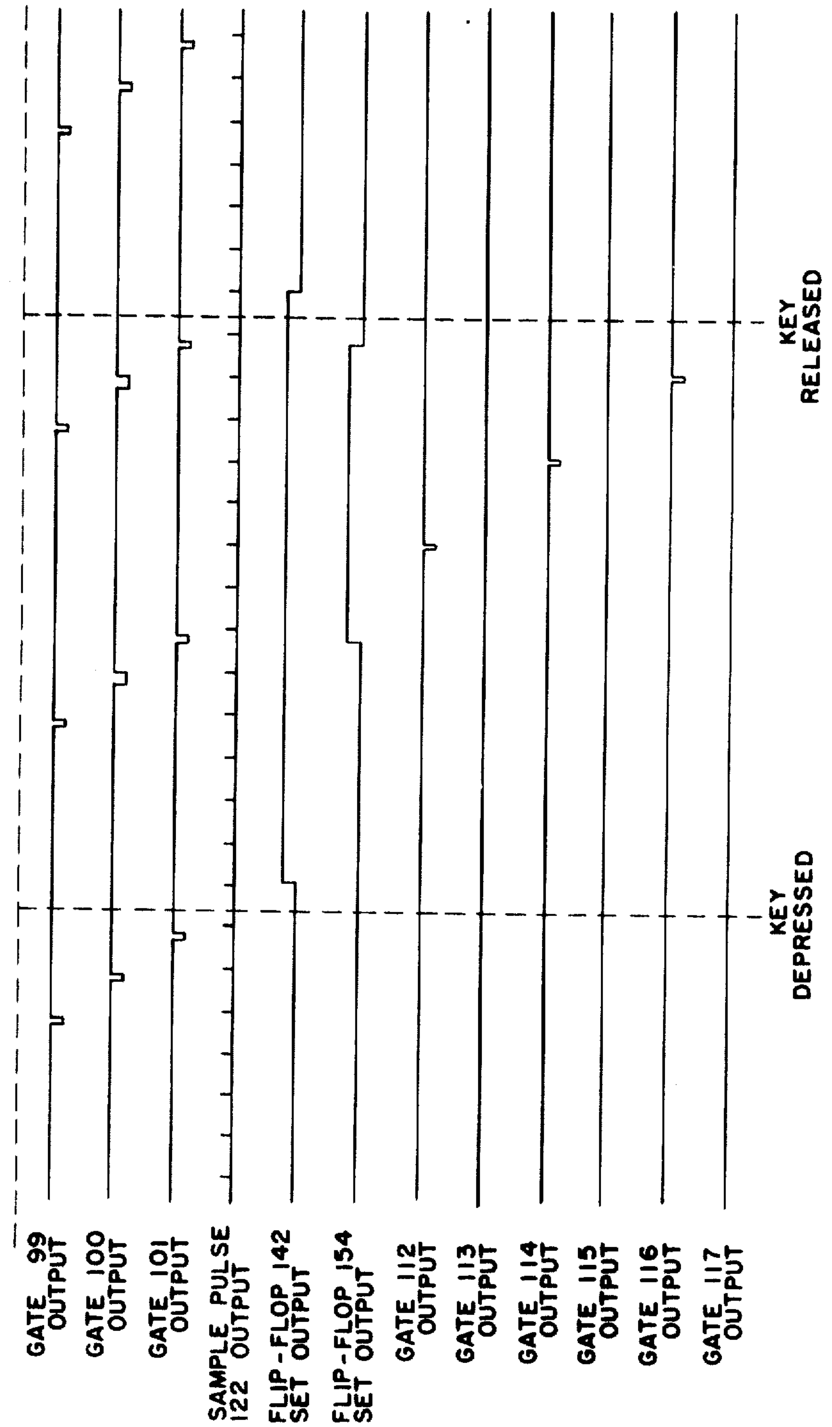

The exemplary key lever 38 shown in FIG. 3 is constructed with shutter portions adapted to block channels 66 corresponding to encoded data bits 1, 3, and 5, as well as the strobe channel. This same key lever is represented in diagrammatic form in FIG. 4, and the waveforms shown in FIGS. 6A and 6B are based upon operation of this particular key lever.

The construction and operation of the circuitry for producing coded output signals in response to manually entered information will now be described. While a specific circuit configuration is illustrated, it will be recognized that the circuit concept could be implemented in various other ways if desired.

Figure 4:
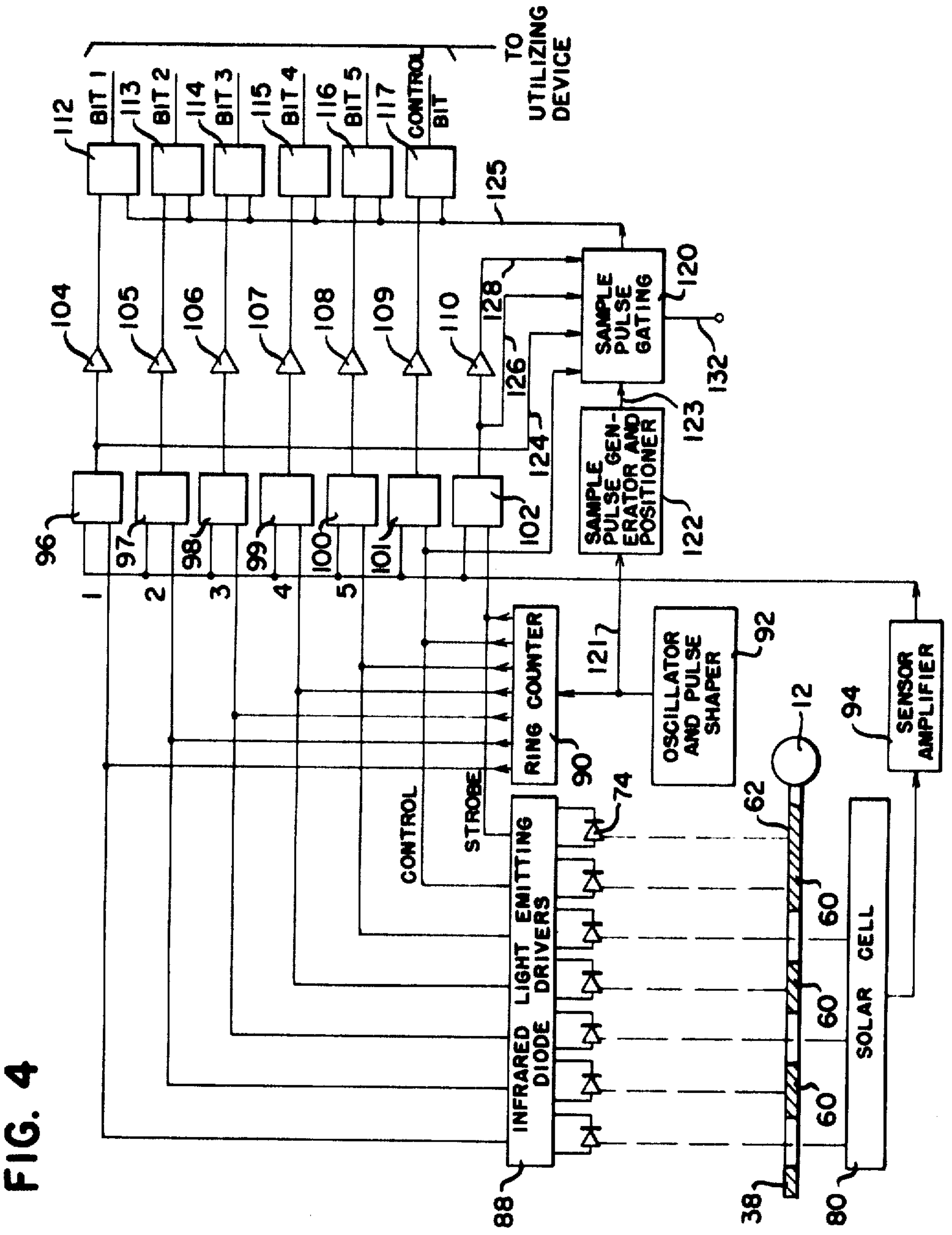
FIG. 4 is a logic block diagram of a data signal encoding system constructed in accordance with the principles of the present invention.

As shown in FIG. 4, the individual radiation-emitting diodes 74 are each connected to a driver which provides the necessary potential for energizing the diode. All of the drivers are represented in FIG. 4 by a single block designated 88. The various drivers are connected by conductors to corresponding elements in a ring counter 90, which in turn is driven by oscillator and pulse shaper 92.

As previously mentioned in the mechanical description of the data entry unit, the diodes 74 are located in alignment with channels in the channel member 64 of the data entry unit 10, and a plurality of mechanical shutter portions on key levers 38, such as the shutter portion 60 diagrammatically shown in FIG. 4, are controlled by keys 12 of the data entry unit to selectively block the path of radiation in the various channels between the diodes 74 and the radiation-sensitive element or solar cell 80.

The radiation-sensitive element 80 is diagrammatically shown in block form in FIG. 4, and is connected to a sensor amplifier 94, which in turn is connected to one input of each of a plurality of NAND-gates 96, 97, 98, 99, 100, 101, and 102, corresponding in number to the number of radiation-emitting diodes 74 and channels in the device of the illustrated embodiment. A second input of each of these NAND gates is connected to the same ring counter element which is connected to the corresponding diode driver, as previously described.

The output of each of the NAND-gates 96 to 102 inclusive is connected through an inverter 104 to 109 inclusive, respectively, to one input of a second NAND-gate 112 to 117 inclusive, respectively. The outputs of these NAND gates constitute data bits 1 to 5 inclusive, which may be applied to a shift register or other utilizing device, as well as a control bit, which may be used to provide a desired control function. It will be recognized that the outputs of the NAND-gates 96 to 101 inclusive could also be used directly as inputs to utilizing devices, if desired. The output of the NAND-gate 102, corresponding to the strobe signal, is connected both directly and through an inverter 110 to a sample pulse gating circuit 120, which will be subsequently described in detail, and which provides a train of sampling pulses to enable the sequential generation of data and control signals at the outputs of the NAND-gates 112 to 117 inclusive. The output 125 of the sample pulse gating circuit 120 is connected to the other input of each of the NAND-gates 112 to 117 inclusive.

A second output branch 121 from the oscillator and pulse shaper 92 is connected to the input of a sample pulse generator and positioner 122, which utilizes the output of the oscillator and pulse shaper 92 to provide a train of shaped pulses of predetermined width and frequency. Any suitable circuit may be employed to produce the desired output pulses, with one suitable arrangement including two serially connected monostable multivibrators, with at least one of said multivibrators being provided with a potentiometer for adjusting pulse timing to the desired values.

The pulse train output of the sample pulse generator and positioner 122 is applied over a conductor 123 to the sample pulse gating circuit 120, which, in response to various controls, as will subsequently be described in detail, determines which pulses of the train will be passed and applied to the NAND-gates 112 to 117 inclusive for generation of the data bit and control signals. Passing or inhibiting of the pulse train by the sample pulse gating circuit is controlled by a first input 124 from the bit 1 NAND-gate 96, by a second input 126 from the strobe NAND-gate 102, by a third input 128 from the inverter 110 associated with the strobe NAND-gate 102, by a fourth input 130 from the "control" position of the ring counter 90, and by a fifth input 132, designated "shift register ready," from the shift register or other utilizing device to which the outputs of the NAND-gates 112 to 117 inclusive are applied.

The operation of the data signal encoding circuitry of FIG. 4 will now be described. Reference may be had to the various waveforms shown in the timing diagram of FIGS. 6A and 6B to aid in the understanding of the operating sequence. The oscillator and pulse shaper 92 operates continuously, so long as power is applied to the data entry unit 10, to generate a train of pulses, which are applied to the ring counter 90 and the sample pulse generator and positioner 122.

Pulsing of the ring counter 90 causes sequential energization of the various positions of the ring counter in a conventional manner. In the illustrated embodiment, the ring counter 90 has seven positions, although obviously a greater or fewer number of positions could be provided, if desired. As shown diagrammatically in FIG. 4, the leftmost position of the ring counter is connected to the NAND-gate 96 and the driver for one of the diodes 74, both corresponding to data bit one. The next four ring counter positions, proceeding to the right, are connected to NAND gates and drivers for diodes corresponding to data bits two to five inclusive. A control position and a strobe position of the ring counter are also provided and are connected to the corresponding NAND gates and diode drivers. It will therefore be seen that, as the ring counter is pulsed, the diodes 74 are sequentially energized to transmit radiation along their associated channels, and, at the same time, pulses appear on one input of each of the NAND-gates 96 to 102 inclusive, in sequence. In the illustrated embodiment, the diodes 74 are pulsed at approximately a 1.6 kHz. rate, with each diode being energized for 80 microseconds and off for 520 microseconds. It may be noted that operation in this pulsed mode allows low duty cycle operation, which gains additional reliability assurance by minimizing average power dissipation.

The sequential radiation pulses appear on the radiation-sensitive element 80, except in those instances in which transmission of radiation through the channel is blocked by the interposition of a shutter portion 60 of a key lever 38. These radiation pulses are converted by the radiation-sensitive element into electrical pulses, and are amplified by the sensor amplifier 94 before being applied to inputs of the NAND-gates 96 to 102 inclusive.

There is a time delay through the sensor amplifier 94 of approximately 15 microseconds. As shown in the timing diagram of FIGS. 6A and 6B (though not to exact scale), this delay results in the appearance of a 15-microsecond pulse at the outputs of the NAND-gates 96 to 102 inclusive when no keys of the unit are depressed. When a key is depressed, the shutter portions on the key lever block radiation in their respective channels, and cause no output to be seen from the sensor amplifier at these times, so that a continuing positive signal level appears at the associated inputs of the NAND-gates 96 to 102 inclusive. This in turn, through the action of those of the NAND-gates 96 to 102 inclusive corresponding to the blocked channels, causes a negative pulse of 80-microsecond width to appear at the outputs of these NAND gates, as shown in the timing diagram. There is thus a 65-microsecond difference in pulse width between the output signal of a NAND gate when a key is not depressed in its related channel, and the output signal when a key is depressed.

The output signals from the NAND-gates 96 to 101 inclusive, representing data bits one to five and the control bit, respectively, are inverted by the inverters 104 to 109 inclusive, and applied to one input of each of the NAND-gates 112 to 117 inclusive. On the other input terminals of these NAND gates, for each key depression, appears a series of seven 2.2 microsecond sampling pulses from the sample pulse gating circuit 120. The resulting output signals from the NAND-gates 112 to 117 inclusive, produced sequentially on said gates as a result of the coincidence of the sampling signals and the inverted data and control signals, constitute the encoded data and control output signals from the data entry device, which may be applied to a shift register or other utilizing device.

The train of 2.2 microsecond sampling pulses referred to above are originally derived from the oscillator and pulse shaper 92, timed and positioned by the sample pulse generator and positioner 122, and gated with respect to initiation and termination by the sample pulse gating circuit 120. As has been stated, this circuit is controlled by inputs 124, 126, 128, 130, and 132. Initial control of the circuit 120 is by the strobe signal. Since, as has been previously described, the mechanical design of the key levers 38 is such that the radiation in the strobe channel is the last to be blocked when a key is depressed, no data bits can be lost. The number of sampling pulses per key depression applied from the circuit 120 to the inputs of the NAND-gates 112 to 117 inclusive is determined by the number of ring counter positions.

Figure 5:
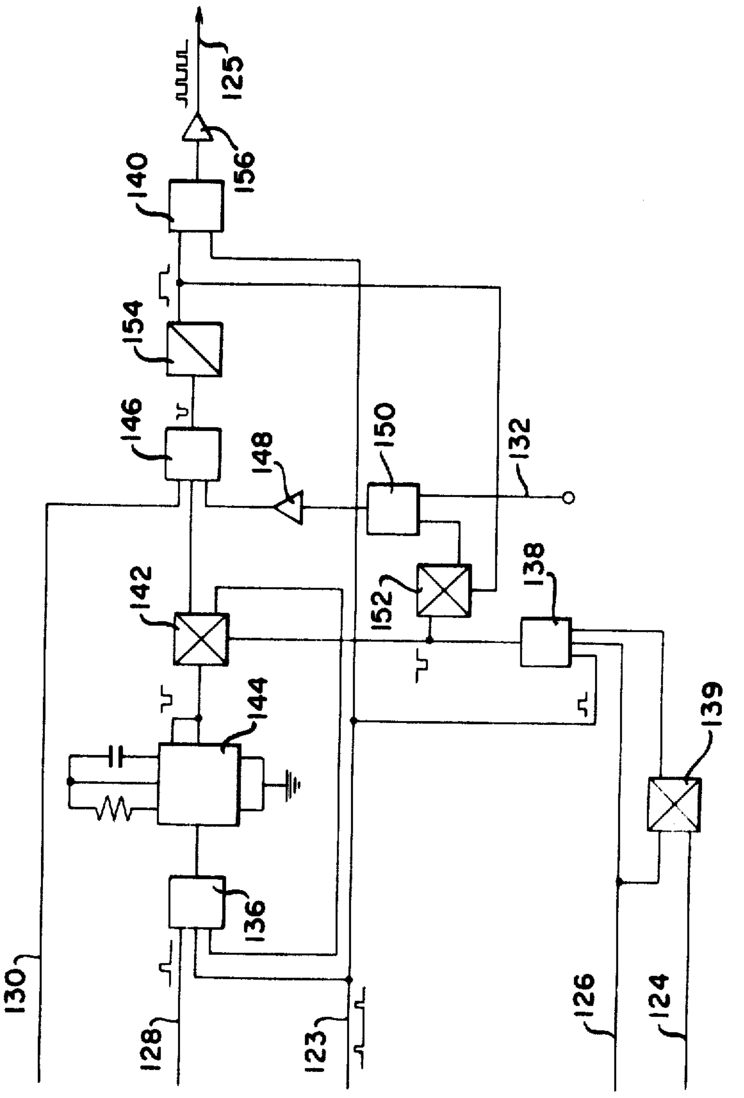
FIG. 5 is a detailed logic diagram of the sample pulse gating means shown in block form in FIG. 1.

The sample pulse gating circuitry represented by the block 120 in FIG. 4 is shown in detail in FIG. 5.

The purpose of the sample pulse gating circuitry is to provide a single sampling of the data introduced into the data entry device by depression of a key 12, and to prevent further data sampling until the serial or parallel transfer of said data out of the shift register or other utilizing device has been completed. The circuitry insures that the depressed key must be fully released, and then that key or another key depressed, before a second sampling of data can take place.

As shown in FIG. 5, the conductor 123 from the pulse generator and positioner 122 is connected to one input of a three-input NAND-gate 136, to one input of a three-input NAND-gate 138, and to one input of a two-input NAND-gate 140. The input 126 is connected directly to a second input of the NAND-gate 138, and also to the set input of a flip-flop 139. The input 124 is connected to the reset input of the flip-flop 139, while the output of said flip-flop is connected to the third input of the NAND-gate 138.

The input 128 from the inverter 110 is connected to a second input of the NAND-gate 136, while the third input of the said NAND-gate is connected to the reset output of a flip-flop 142. The output of the NAND-gate 136 is connected to a "one shot" or monostable multivibrator 144, the output of which is applied to the clock input of the flip-flop 142. The reset input of said flip-flop is connected to the output of the NAND-gate 138, while the set output of said flip-flop is applied to one input of a three-input NAND-gate 146. The input 130 from the control position of the ring counter 90 is applied to a second input of the NAND-gate 146, while the third input is applied over an inverter 148 from a two-input NAND-gate 150. A first input to said gate is provided by the "shift register ready" input 132, while the second input is connected to the reset output of a flip-flop 152.

The reset input of the flip-flop 152 is connected to the output of the NAND-gate 138, while the clock input of the flip-flop 152 is connected to the set output of a flip-flop 154, the clock input of which is connected to the output of the NAND-gate 146. The set output of the flip-flop 154 is also connected to one input of the NAND-gate 140, and it will be recalled that the other input of said gate is connected to the conductor 123 from the pulse generator and positioner 122.

The output from the NAND-gate 140 is connected to the input of an inverter 156, the output 125 of which constitutes the output from the sample pulse gating circuitry 120 (FIG. 5), and is applied to the NAND-gates 112 to 117 inclusive, as previously described.

Operation of the circuit of FIG. 5 is as follows. Reference may be had to the timing diagram of FIGS. 6A and 6B to aid in the understanding of this description. A continuous train of positive-going pulses is applied by the conductor 123 to the NAND-gate 140, where further transmission is controlled by the present circuit. Until a key is depressed, the pulse train will not appear on the output 125.

When any key 12 or 14 of the data entry device 10 is depressed, the strobe channel 66 (FIG. 3) is blocked, and an 80-microsecond positive-going pulse appears on the input 128 from the inverter 110. This causes a coincidence of the sample pulse on input 123, the strobe pulse on input 128, and the positive signal from the reset output of the flip-flop 142, at the inputs of the NAND-gate 136, producing a negative output signal which triggers the "one shot" 144. The resulting negative output signal from the "one shot" 144 is applied to the flip-flop 142, to set it, thus changing the reset output of said flip-flop to a negative signal, which in effect disables the NAND-gate 136, preventing any further pulses from triggering the "one shot" 144.

The set output of the flip-flop 142 shifts to a positive level, and this signal is applied to one input of the NAND-gate 146. The input from the inverter 148 is also positive at this time. Therefore, when a positive control bit signal appears on input 130 in the course of regular sequential operation of the ring counter 90, a negative output signal from the gate 146 is produced, and is applied to the flip-flop 154 to set it. The resulting positive output from said flip-flop is applied to one of the inputs of the NAND-gate 140, which permits the positive pulse train applied to the other input of said gate to produce negative output pulses from said gate, which are inverted by the inverter 156 to produce the desired train of sampling pulses on output 125 for application to inputs of the NAND-gates 112 to 117 inclusive.

On the second application of the control bit signal over the input 130 to the NAND-gate 146, the resulting output causes the flip-flop 154 to be reset. Its output thus shifts to a negative signal level, which essentially disables the NAND-gate 140, thus terminating the pulse train after 7 pulses have been passed by said gate.

As the output signal from the flip-flop 154 goes negative, it causes the flip-flop 152 to be set, so that a negative signal is produced on its reset output, which is connected to one input of the NAND-gate 150. The output of the gate 150, acting through the inverter 148, thus prevents any further control pulses from producing a negative output from the NAND-gate 146 until such time as a "shift register ready" signal is applied to input 132, and a second key is depressed, as will be subsequently described.

It will now be assumed that a positive "shift register ready" signal is applied to the input 132, and that the depressed key is still depressed. Release of this key and consequent unblocking of the strobe channel produces the following effects. The flip-flop 139 is set by the leading edge of the negative strobe pulse on the input 126, which same signal is also applied to one input of the NAND-gate 138, together with the positive output of the flip-flop 139 as it is set. It will be recalled that the third input of the NAND-gate 138 is connected to the sample pulse input 123.

Since no key 12 is depressed, the negative pulse on the input 126 is only 15 microseconds in duration, as compared to 80 microseconds when a key is depressed. This results in coincidence at all of the inputs to the NAND-gate 138 when the next true sample pulse appears on the input 123. The output of the gate 138 then goes negative, and this is effective to reset the flip-flops 142 and 152. It should be noted that the negative reset output pulse from the NAND-gate 138 is prevented from appearing during the strobe portion of a cycle in which a key is depressed, because of the negative strobe signal input to the NAND-gate 138. When the bit one pulse of at least 15 microseconds duration is applied on the input 124, this is effective to reset the flip-flop 139, so that the output of said flip-flop connected to the NAND-gate 138 goes negative, which essentially disables the NAND-gate 138, to prevent any negative reset pulses from being generated thereby to reset the flip-flops 142 and 152.

Since the "shift register ready" signal on the input 132 was assumed to be positive, and since resetting of the flip-flop 152 produces a positive signal on the other input of the NAND-gate 150, its output shifts to a negative level, which is inverted to a positive level by the inverter 148 and applied to one input of the NAND-gate 146. This, in effect, returns control of the sample pulse gating to the strobe input 128 once more, to await depression of the next key, at which time another cycle will take place in which seven sampling pulses are passed by the sample pulse gating circuitry 120.

While the form of the invention illustrated and described herein is particularly adapted to fulfill the objects aforesaid, it is to be understood that other and further modifications within the scope of the following claims may be made without departing from the spirit of the invention.

1. In a data entry device for generating a plurality of electrical output signals in accordance with data entered into said device, the combination comprising

- a channel member including a plurality of channels;
- a separate light emitting diode disposed in operative relation to each channel; radiation-sensitive means disposed transversely of the channels so that said radiation-sensitive means may be illuminated by radiation emitted from different light emitting diodes and passing through the respective channels;
- a plurality of shutter means each having at least one portion which may be displaced into one of said channels to block radiation in said channel;
- a plurality of separate data gating means each having a separate output on which electrical signals representative of data entered into the device may appear, and also having at least two input means;
- sequential control means for generating a plurality of control signals and applying said signals to sequentially energize said light emitting diodes, said signals also being applied sequentially to one of the input means on each of said data gating means; and
- means for applying signals generated by said radiation-sensitive means in response to radiation impinging on said means from various ones of said light emitting diodes to a second input means of each of said data gating means.

2. The data entry device of claim 1, in which the sequential control means includes signal generating means for generating a train of timing signals and a ring counter for utilizing said timing signals to sequentially energize said light emitting diodes and to apply timing signals sequentially to one of the input means on each of the data gating means.

3. In a data entry device for generating a plurality of electrical output signals in accordance with data entered into said device, the combination comprising

- a channel member including a plurality of channels;
- a radiation-emitting element disposed in operative relation to each channel;
- radiation-sensitive means disposed transversely of the channels so that said radiation sensitive means may be illuminated by radiation emitted from different radiation-emitting elements and passing through the respective channels;
- a plurality of shutter means each having at least one portion which may be displaced into one of said channels to block radiation in said channel;
- a plurality of separate NAND gates each having a separate output on which electrical signals representative of data entered into the device may appear, and also having at least two input means;
- sequential control means for generating a plurality of control signals and applying said signals to sequentially energize said radiation-emitting elements, said signals also being applied sequentially to one of the input means on each of said NAND gates; and
- means for applying signals generated by said radiation-sensitive means in response to radiation impinging on said means from various ones of said radiation-emitting means to a second input means of each of said NAND gates.

4. In a data entry device for generating a plurality of electrical output signals in accordance with data entered into said device, the combination comprising

- a channel member including a plurality of channels;
- a radiation-emitting element disposed in operative relation to each channel;
- radiation-sensitive means disposed transversely of the channels so that said radiation-sensitive means may be illuminated by radiation emitted from different radiation-emitting elements and passing through the respective channels;
- a plurality of shutter means each having at least one portion which may be displaced into one of said channels to block radiation in said channel;
- a plurality of separate data gating means each having a separate output on which electrical signals representative of data entered into the device may appear, and also having at least two input means;
- sequential control means for generating a plurality of control signals and applying said signals to sequentially energize said radiation-emitting elements, said signals also being applied sequentially to one of the input means on each of said data gating means;
- means for applying signals generated by said radiation-sensitive means in response to radiation impinging on said means from various ones of said radiation-emitting means to a second input means of each of said data gating means;

a plurality of second gating means, each having an output on which output signals representative of data entered into the data entry device may be applied to a utilizing device, each of the plurality of second gating means also having at least two input means, to a first of which an output signal from a corresponding one of the data gating means is applied; and sample pulse generating and gating means for applying a timed sequence of a number of sample pulses equal to the number of second gating means to a second input means of each of said second gating means.

5. The data entry device of claim 4 in which the channels of the channel member are assigned to data, control and strobe information, and in which the gating of the sample pulses is controlled by strobe, control and data signals.

6. In a data entry device for generating a plurality of electrical output signals in accordance with data entered into said device, the combination comprising a channel member including a plurality of channels;

a radiation-emitting element disposed in operative relation to each channel;

radiation-sensitive means disposed transversely of the channels so that said radiation-sensitive means may be illuminated by radiation emitted from different radiation-emitting elements and passing through the respective channels;

a plurality of shutter means each having at least one portion which may be displaced into one of said channels to block radiation in said channel;

a plurality of separate data gating means each having a separate output on which electrical signals representative of data entered into the device may appear, and also having at least two input means;

sequential control means for generating a plurality of control signals and applying said signals to sequentially energize said radiation-emitting elements, said signals also being applied sequentially to one of the input means on each of said data gating means, said sequential control means including signal generating means for generating a train of timing signals and counter means for utilizing said timing signals to sequentially energize said radiation-emitting elements, and to apply timing signals sequentially to one of the input means on each of the data gating means;

means for applying signals generated by said radiation-sensitive means in response to radiation impinging on said means from various ones of said radiation-emitting means to a second input means of each of said data gating means;

a plurality of second gating means, each having an output on which output signals representative of data entered into the data entry device may be applied to a utilizing device, each of the plurality of second gating means also having at least two input means, to a first of which an output signal from a corresponding one of the data gating means is applied;

sample pulse generating means operatively connected to the signal generating means for generating a train of sampling pulses; and sample pulse gating means for gating the train of sample pulses produced by the sample pulse generating means to produce a timed sequence of output sample pulses, equal in number to the number of second gating means, for each data entry operation of the data entry means, said output sample pulses being applied to second input means of said second gating means to produce timed sequential output signals.

7. The data entry device of claim 6, in which said data gating means and said second gating means are NAND gates.

8. In a data entry device for generating a plurality of electrical output signals in response to the selective operation of manually controlled input means, the combination comprising a channel member including a plurality of channels, said channels being assigned to data, control and strobe information;

a radiation-emitting element disposed in operative relation to each channel;

radiation-sensitive means disposed transversely of the channels in the channel member so that said radiation-sensitive means may be illuminated by radiation emitted from different radiation-emitting elements and passing through the respective channels;

a plurality of manually controlled means each having at least one portion which may be displaced into one of said channels to block radiation in said channel;

a plurality of first gating means corresponding to said channels, each having an output on which electrical signals representative of data, control and strobe information entered into the device by the manually controlled means may appear, and also having at least two input means;

signal generating means for generating a train of timing signals;

ring counter means for utilizing said timing signals to sequentially energize said radiation-emitting elements, and to apply timing signals sequentially to one of the input means on each of said first gating means; sensor means connected to said radiation-sensitive means for receiving sequential signals generated by said radiation-sensitive means in response to radiation impinging on said means from various ones of said radiation-emitting means and applying said signals to a second input means of each of said first gating means;

a plurality of inverters for inverting the output signals from the plurality of first gating means;

a plurality of second gating means each having an output on which output signals representative of data manually entered into the data entry device may be applied to a utilizing device, and each of the plurality of second gating means also having at least two input means, to a first of which an output signal from a corresponding one of said inverters is applied;

sample pulse generating means operatively connected to the signal generating means for generating a train of sample pulses; and sample pulse gating means for gating the train of sample pulses produced by the sample pulse generating means to produce a timed sequence of output sample pulses, equal in number to the number of said second gating means, for each manual data entry operation of the data entry means, said output sample pulses being applied to second input means of said second gating means to produce timed sequential output signals, said sample pulse gating means being controlled by strobe, control and data signals, and by a signal from the utilizing device.

9. The data entry device of claim 8, in which said first and second gating means are NAND gates.

10. The data entry device of claim 8, in which the radiation-emitting elements are infrared light-emitting diodes.

11. The data entry device of claim 8, in which the radiation-sensitive means is a solar cell.